United States Patent [19]

Harrison

[11] 4,019,613
[45] Apr. 26, 1977

[54] DISCS FOR DISC BRAKES
[75] Inventor: Anthony William Harrison, Birmingham, England
[73] Assignee: Girling Limited, Birmingham, England
[22] Filed: Sept. 23, 1975
[21] Appl. No.: 615,893
[30] Foreign Application Priority Data
Oct. 2, 1974 United Kingdom ............ 42701/74
[52] U.S. Cl. ......................... 188/218 XL; 188/18 A
[51] Int. Cl.² ........................................ F16D 65/12
[58] Field of Search ............ 188/731, 732, 218 XL, 188/18 A, 264 A; 192/107 R
[56] References Cited
UNITED STATES PATENTS 2,243,334  5/1941  Eksergian ................... 188/218 XL
2,485,082  10/1949  Bachman ................... 188/218 XL
3,786,904  1/1974  Hotchkiss ...................... 192/107 R
3,899,054  8/1975  Huntress et al. ............ 188/218 XL

FOREIGN PATENTS OR APPLICATIONS 1,032,923  6/1966  United Kingdom ......... 188/218 XL Primary Examiner—Duane A. Reger
Attorney, Agent, or Firm—Scrivener Parker Scrivener and Clarke

[57] ABSTRACT

In a disc for a disc brake a clamping assembly having a certain amount of resilience holds two identical braking portions in engagement with a central plate, and a coupling device is provided for transmitting torque from the braking portions to the central plate and for maintaining the braking portions concentric with the plate.

14 Claims, 4 Drawing Figures

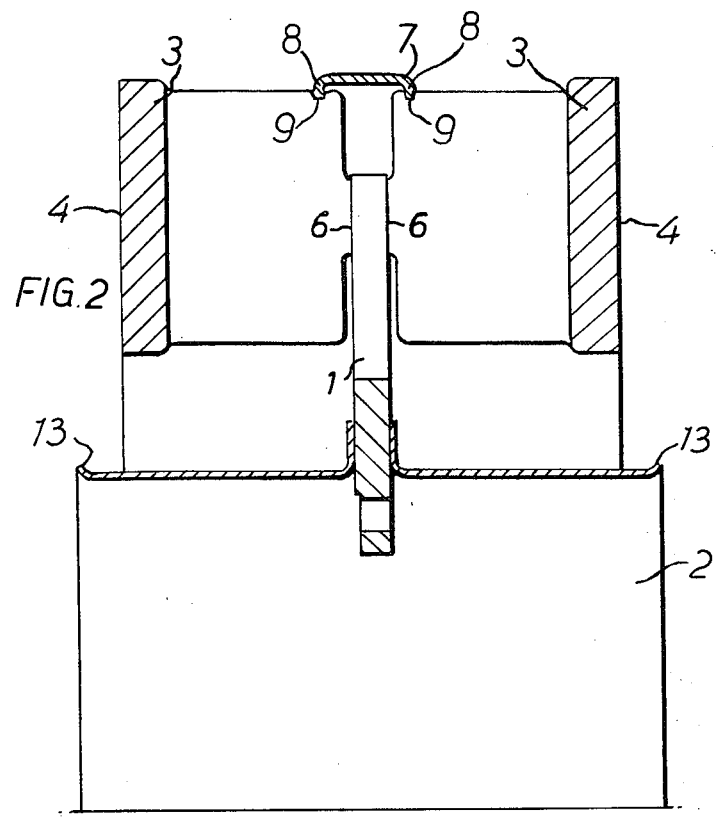
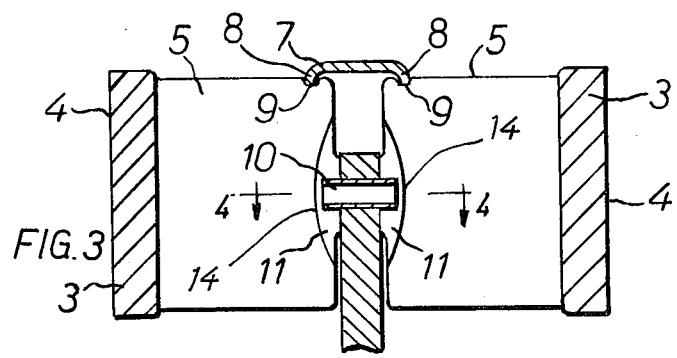
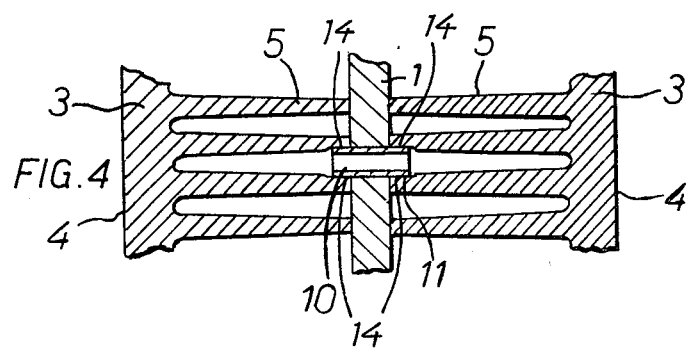

DISCS FOR DISC BRAKES

This invention relates to improvements in discs for disc brakes.

Early disc brakes for vehicles employed a flat disc extending radially from one end of a bell adapted to be secured to a flange on a wheel or shaft.

As the weight and speed of vehicles increased it was found that to prevent or reduce overheating of the disc and its mounting it was necessary or desirable to provide radial or part-helical passages in the disc for the flow of cooling air.

The duty required from disc brakes goes on increasing with further increases in the weight and speed of vehicles, and as the diameter of the disc cannot be increased beyond a certain size the surface area available for cooling can only be increased by an increase in the axial dimension of the braking portion of the disc.

If an axially long disc is mounted in the conventional way on one end of a bell several problems can arise:

a. the extra weight can cause excessive vibration, b. the temperature difference between the braking portion and bell causes thermal stresses which leads to distortion and possible failure, c. the heat flow to the hub can cause the bearings and seals to over-heat leading to failure, d. a complex casting core is necessary resulting in an expensive disc.

In some brake installations for spatial reasons the axial length of the bell may be reduced or the disc may be mounted directly on the hub. That reduces the weight of the disc but the problems of temperature and heat flow become more critical.

One object of our invention is to provide a ventilated disc in which these difficulties are overcome.

According to our invention a disc for a disc brake comprises a central plate adapted to be mounted on a rotatable hub or the like, two identical braking portions located one on each side of the central plate and each comprising an annulus providing a radial braking surface on its outer side and having on its inner side angularly spaced axially extending radial vanes of which the free ends abut and are held against the central plate, clamping means having a certain amount of resilience for holding and braking portions in engagement with the central plate, and coupling means for transmitting torque from the braking portions to the central plate and for maintaining the brake portions concentric with the plate.

The vanes are preferably tapered in an axial direction, and portions of the free edges of the vanes at their radially inner and outer ends are cut away or set back to reduce to a minimum the area of contact of the vanes with the central plate.

The clamping means may comprise a strip which encloses the braking portions and has inwardly cranked edges which are engaged in notches in the outer edges of the vanes near their free ends. After assembly free ends of the strip are welded together to form a continuous band.

The coupling means may comprise roll pins fixed in the central plate with their ends engaging in the adjacent vanes of both braking portions.

Alternatively the pins may be a good fit in holes in the vane area and slide in slots in the central plate.

Radial slots are preferably machined in the central plate to allow for thermal expansion and relieve stresses.

Annular guards or deflectors may be mounted on each side of the central plate to prevent oil or dirt from being thrown out on to the disc.

Our improved brake disc has the following advantages.

Thermal stresses in each component are considerably reduced so that the disc is less prone to distortion and failure in use.

There is a much reduced heat path between the braking surfaces and the mounting flange on the hub or other rotating member.

The disc incorporates a certain amount of freedom of movement between the component parts which ensures that in a disc brake friction pads for engagement with opposite faces of the disc remain parallel with the braking faces of the disc. That evens out the pad pressure on the braking path and ensures a uniform distribution of the heat generated by friction which results in more regular pad wear.

The components are relatively easy to cast and require a minimum of machining.

One example of a brake disc in accordance with our invention is illustrated in the accompanying drawings, in which:

FIG. 2 is a section in a radial plane; p FIG. 3 is a fragmentary section on the line 3—3 of FIG. 1;

FIG. 4 is a section on the line 4—4 of FIG. 3 and

Figure 1:
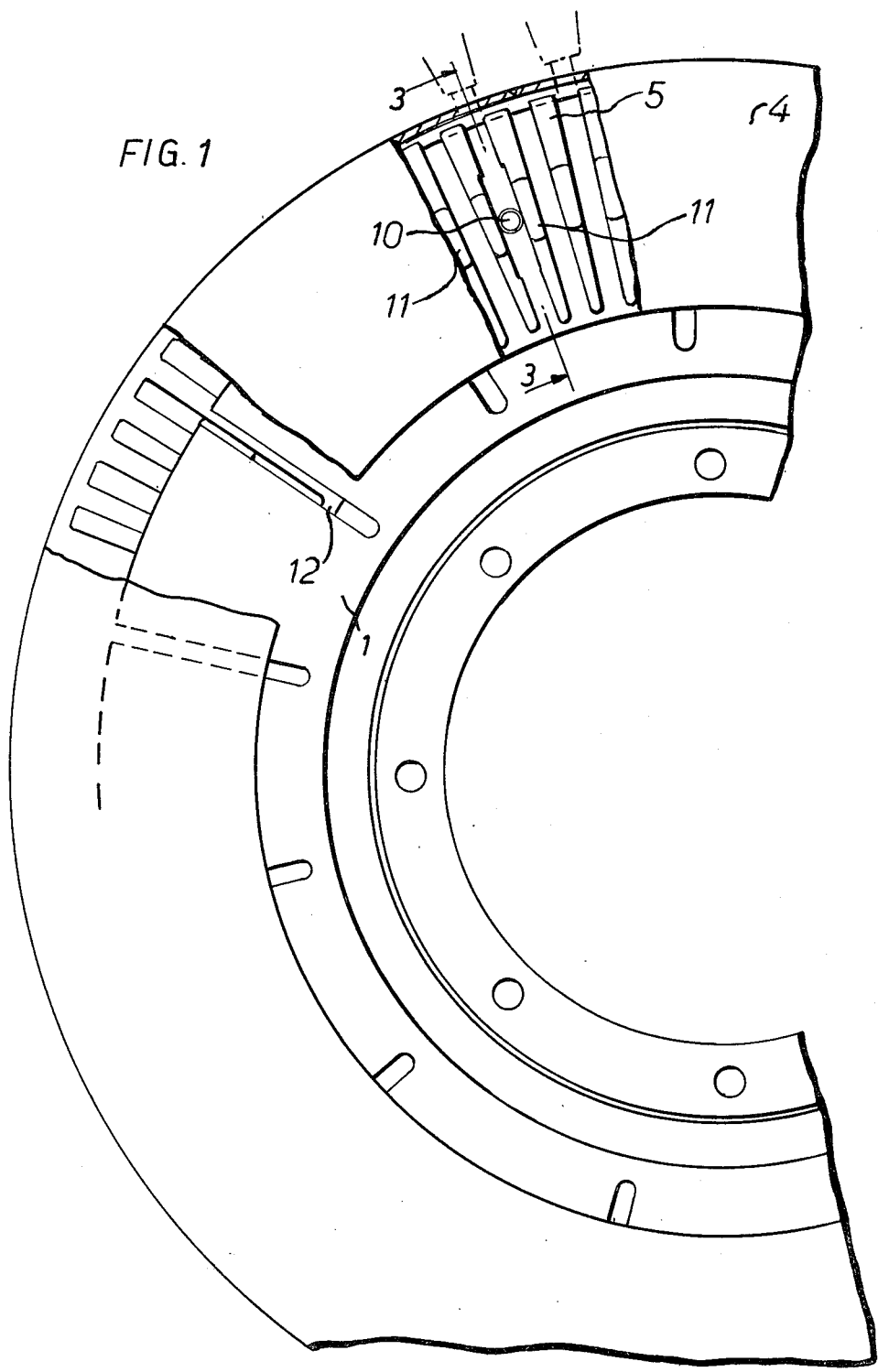
FIG. 1 is an end view of the disc partly broken away.

The disc illustrated in the drawings comprises a central parallel sided planar plate 1 of annular outline adapted to be mounted at its inner peripheral edge on a rotatable hub or the like 2, and opposed axially spaced identical annular braking portions 3 located on opposite sides of the central plate 1.

Each braking portion 3 comprises a flat radial braking surface 4 at the outer end of a plurality of integral angularly spaced axially extending vanes 5 which are tapered in a direction away from the braking surface and abut at their narrower free ends against one side of the central plate. These free ends are cut away or set back both at their radially innermost and outermost ends so that only a radially short median port 6 is in contact with the central plate 1.

The free ends of the vanes 5 at both braking portions 3 are held against opposite sides at the central plate by means of a clamping strip 7 which encircles the vanes 5 and the plate 1 and is provided with inwardly cranked edges 8 which are engaged in notches 9 in the outer edges of the vanes 5 adjacent to their free ends. After assembly the ends of the strip 7 are welded together to form a continuous band which allows for a certain amount of resilience in the assembly.

Roll pins 10 fixed in the central plate and engaged at opposite ends in grooves 11 in the vanes 5 transmit torque from the braking portions 3 to the central plate 1 and keep the braking portions concentric with the central plate. As illustrated in FIGS. 3 and 4 each groove 11 is defined between spaced walls 14 which are of arcuate outline.

Figure 5:
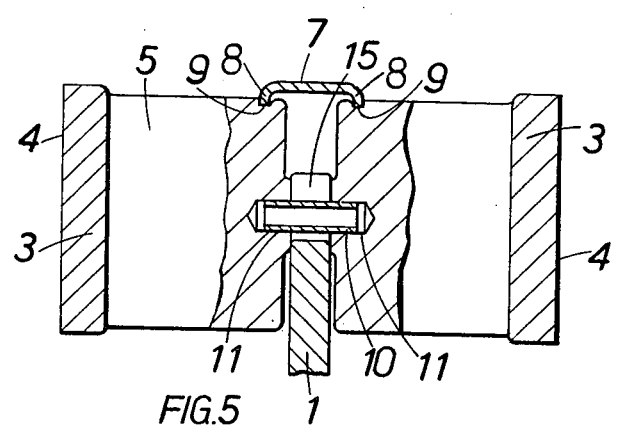
FIG. 5 is a section similar to FIG. 3 but showing a modification.

In a modified construction illustrated in FIG. 5 the pins 10 are a good fit in the grooves 11 and slide in slots 15 in the central plate 1.

Radial slots, of which one is shown at 12, are machined in the central plate 1 to allow for thermal expansion and to relieve stresses.

Annular guards or deflectors 13 may be mounted on each side of the central plate 1 to prevent oil or dirt from being thrown onto the disc.

It will be appreciated that with a disc of the form illustrated it is possible to have a greater number of vanes providing a greater cooling surface than is possible with a conventional ventilated disc. This is possible because the core is much stronger when supported on three sides, whereas in a conventional disc the cooling passage portion must be of larger cross-section as it is only supported at opposite ends.

It will also be appreciated that cooling air can enter the disc assembly from both axial directions. This is important because, as the discs get longer axially, the critical area for the flow of cooling air is no longer the area of the passages between the vanes but the area of the "eye" i.e. the annular area between the inner periphery of the braking surfaces and the outer diameter of the adjacent portion of the hub.

By allowing air to flow axially into the disc from both directions the effective area of the "eye" can be approximately doubled, thus allowing the passage through the disc of greater volumes of cooling air.

I claim:

1. A disc for a disc brake comprising a central plate adapted to be mounted on a rotatable part, two separate braking portions located one on each side of said central plate and each comprising a continuous annulus having an outer side and an inner side, said outer side providing a radial braking surface and said inner side having angularly spaced axially extending vanes of which the free ends abut said central plate, clamping means for holding said free ends of said vanes against and in engagement with said central plate, said clamping means having a certain amount of resilience for resiliently urging said braking portions tightly against said central plate, and coupling means for transmitting torque from said braking portions to said central plate and for maintaining said braking portions concentric with said central plate, said coupling means being separate from said central plate and said braking portions.

2. A disc as claimed in claim 1, wherein said vanes are tapered in an axial direction.

3. A disc as claimed in claim 1, wherein portions of free edges of said vanes are cut back to reduce to a minimum the area of contact of said vanes with said central plate.

4. A disc as claimed in claim 3, wherein said free edges of said vanes at the radially inner and outer ends thereof are cut back.

5. A disc as claimed in claim 1, wherein said clamping means comprises a band which encircles said braking portions and has inwardly directed cranked edges which ae engaged in notches in outer edges of said vanes.

6. A disc as claimed in claim 5, wherein said band comprises a strip having free ends which after assembly are welded together.

7. A disc as claimed in claim 1, wherein said coupling means comprises roll pins received in said central plate and at opposite ends in adjacent vanes of both said braking portions.

8. A disc as claimed in claim 7, wherein said pins are fixed in said central plate and are engaged in grooves in said vanes.

9. A disc as claimed in claim 7, wherein said pins are a good fit in holes in said vanes and slide in slots in said central plate.

10. A disc as claimed in claim 1, wherein said radial slots are provided in said central plate.

11. A disc as claimed in claim 1, wherein annular guards are mounted on at least one side of said central plate.

12. A disc as claimed in claim 1, wherein said vanes are radially arranged.

13. A disc as claimed in claim 1, wherein both said braking portions are identical with each other.

14. A disc as claimed in claim 8, wherein each of said grooves is defined between spaced parallel walls which are of arcuate outline.

* * * * *